United States Patent
Satish et al.

(10) Patent No.: US 7,885,639 B1
(45) Date of Patent: Feb. 8, 2011

(54) METHOD AND APPARATUS FOR AUTHENTICATING A WIRELESS ACCESS POINT

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1101 days.

(21) Appl. No.: 11/477,505

(22) Filed: Jun. 29, 2006

(51) Int. Cl.
*H04L 9/32* (2006.01)
*H04L 9/14* (2006.01)
*H04L 9/28* (2006.01)

(52) U.S. Cl. .................. 455/410; 455/411; 726/26; 726/23; 726/25

(58) Field of Classification Search ............. 455/411
See application file for complete search history.

(56) References Cited

U.S. PATENT DOCUMENTS

| | | | |
|---|---|---|---|
| 6,799,272 B1 * | 9/2004 | Urata ..................... 713/171 |
| 6,842,621 B2 * | 1/2005 | Labun et al. ............ 455/456.3 |
| 7,002,943 B2 * | 2/2006 | Bhagwat et al. ........... 370/338 |
| 7,221,750 B2 * | 5/2007 | Brahmbhatt et al. ... 379/201.06 |
| 7,428,747 B2 * | 9/2008 | Dawson ..................... 726/2 |
| 2004/0198220 A1 * | 10/2004 | Whelan et al. ............. 455/41.1 |
| 2004/0268119 A1 * | 12/2004 | Smetters et al. ........... 713/155 |
| 2005/0254474 A1 * | 11/2005 | Iyer et al. ................. 370/338 |
| 2006/0114863 A1 * | 6/2006 | Sanzgiri et al. ............ 370/338 |
| 2006/0233114 A1 * | 10/2006 | Alam et al. ............... 370/252 |
| 2007/0186276 A1 * | 8/2007 | McRae et al. ............... 726/4 |

* cited by examiner

*Primary Examiner*—Rafael Pérez-Gutiérrez
*Assistant Examiner*—Frank Donado
(74) *Attorney, Agent, or Firm*—Moser IP Law Group

(57) ABSTRACT

A method, system and computer-readable medium for authenticating a wireless access point is described. The method comprises upon initially connecting to the wireless access point, storing a first service set identifier associated with the wireless access point, storing a first media access control address for the wireless access point and associating the first media access control address for the wireless access point with the first service set identifier for the wireless access point. The system comprises a computing device for executing wireless security software wherein the wireless security software upon initial connection of the computing device to the wireless access point, stores a first service set identifier associated with the wireless access point, stores a first media access control address for the wireless access point and associates the first media access control address for the wireless access point with the first service set identifier for the wireless access point.

15 Claims, 3 Drawing Sheets

METHOD AND APPARATUS FOR AUTHENTICATING A WIRELESS ACCESS POINT

BACKGROUND OF THE INVENTION

1. Field of the Invention

Embodiments of the present invention generally relate to wireless security and, more particularly, a method and apparatus for authenticating a wireless access point.

2. Description of the Related Art

Public access to the Internet has increased dramatically in the last several years. Business people, students and travelers rely on the Internet to keep in constant communication with their workplaces, universities, family and friends. People also rely on the Internet to receive the most up-to-date news and financial information such as stock market quotes. As a result, coffee shops, cafes, and other businesses commonly offer wireless Internet access to attract customers that require a constant Internet connection.

The number of computers in a private home has also increased in the last several years. A family may have one computer specifically for children to use for homework and another computer specifically for parents. A parent or a student may have a laptop computer he or she brings home from work or school. Typically, it is desirable for all of these computers to have access to the Internet. A wireless router can provide Internet access to all of the computing devices in the home, allowing each computer to share Internet access. The wireless router also provides an additional benefit by avoiding the expense and hassle of installing a wired connection for each computer in the home.

Each connection to a wireless network is made via a "wireless access point". Wireless access points are also sometimes known as "hotspots" or "Wi-fi hotspots". A wireless access point may be a wireless router, another computer connected to the network, or any device that allows a computer to connect to the network. The network may be the Internet, a local area network (LAN), a wide area network (WAN), home network, corporate intranet, ad hoc network or any computer network. Wireless access point broadcast a service set identifier (SSID) identifying the presence of a wireless network. Computers can attempt to connect to the wireless access point once the SSID is known.

As the number of wireless access points has increased, cybercriminals have developed methods to intercept information destined for these wireless access points. One such threat to the security of a wireless access point is known as the "evil twin" access point. The cybercriminal deploys a wireless access point that broadcasts the same SSID as a known wireless access point but with stronger signal strength. A computer is typically set to automatically reconnect to with any known SSID, i.e., an SSID with the same name as a previously connected to SSID. A computer is also typically set to connect to a known SSID broadcasting the strongest signal. Because the evil twin access point is broadcasting the same SSID as a known wireless access point and at stronger signal strength, the computer may automatically connect to the evil twin access point instead of the legitimate wireless access point.

Once the computer is connected to the evil twin wireless access point, the cybercriminal receives all of the information originally intended for the legitimate wireless access point. This information may include credit card information, user names and passwords, and other sensitive information. The cybercriminal can also use the evil twin wireless access point to infect the computer with a computer virus or other malware. Because the evil twin wireless access point broadcasts the same SSID as the legitimate wireless access point, the user is often unaware he has connected to the evil twin wireless access point and that he is transmitting his information directly to the cybercriminal.

Further computers can only identify a wireless access point by the SSID. Each time a computer encounters a wireless access point with an SSID identical to a previously encountered SSID, the computer assumes the wireless access point is the same as the previously encountered wireless access point. A false level of trust and security is built into identifying a wireless access point by only the SSID. The user may also set the computer to automatically connect to a known wireless access point, in which case an evil twin wireless access point may broadcast a commonly used SSID to ensnare a connection by the unsuspecting user. Currently, a method does not exist for a computer to authenticate a wireless access point by anything other than the SSID.

Thus, there is a need in the art for a method and apparatus that enables a computer to authenticate a wireless access point in a manner that does not solely rely upon the SSID.

SUMMARY OF THE INVENTION

The present invention generally relates to wireless security and, more specifically, to a method and apparatus for authenticating a wireless access point. A method, system and computer-readable medium for authenticating a wireless access point is described. The method comprises upon initially connecting to the wireless access point, storing a first service set identifier associated with the wireless access point, storing a first media access control address for the wireless access point and associating the first media access control address for the wireless access point with the first service set identifier for the wireless access point. The system comprises a computing device for executing wireless security software wherein the wireless security software upon initial connection of the computing device to the wireless access point, stores a first service set identifier associated with the wireless access point, stores a first media access control address for the wireless access point and associates the first media access control address for the wireless access point with the first service set identifier for the wireless access point.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present invention is a method, system and computer-readable medium for authenticating a wireless access point. By associating at least a media access control (MAC) address with an SSID for the wireless access point, wireless security software can authenticate the wireless access point. Each wireless access point is assigned a globally unique MAC address by the manufacturer. Because the MAC address is globally unique, the wireless security software can differentiate between two wireless access points that broadcast the same SSID.

Figure 1:
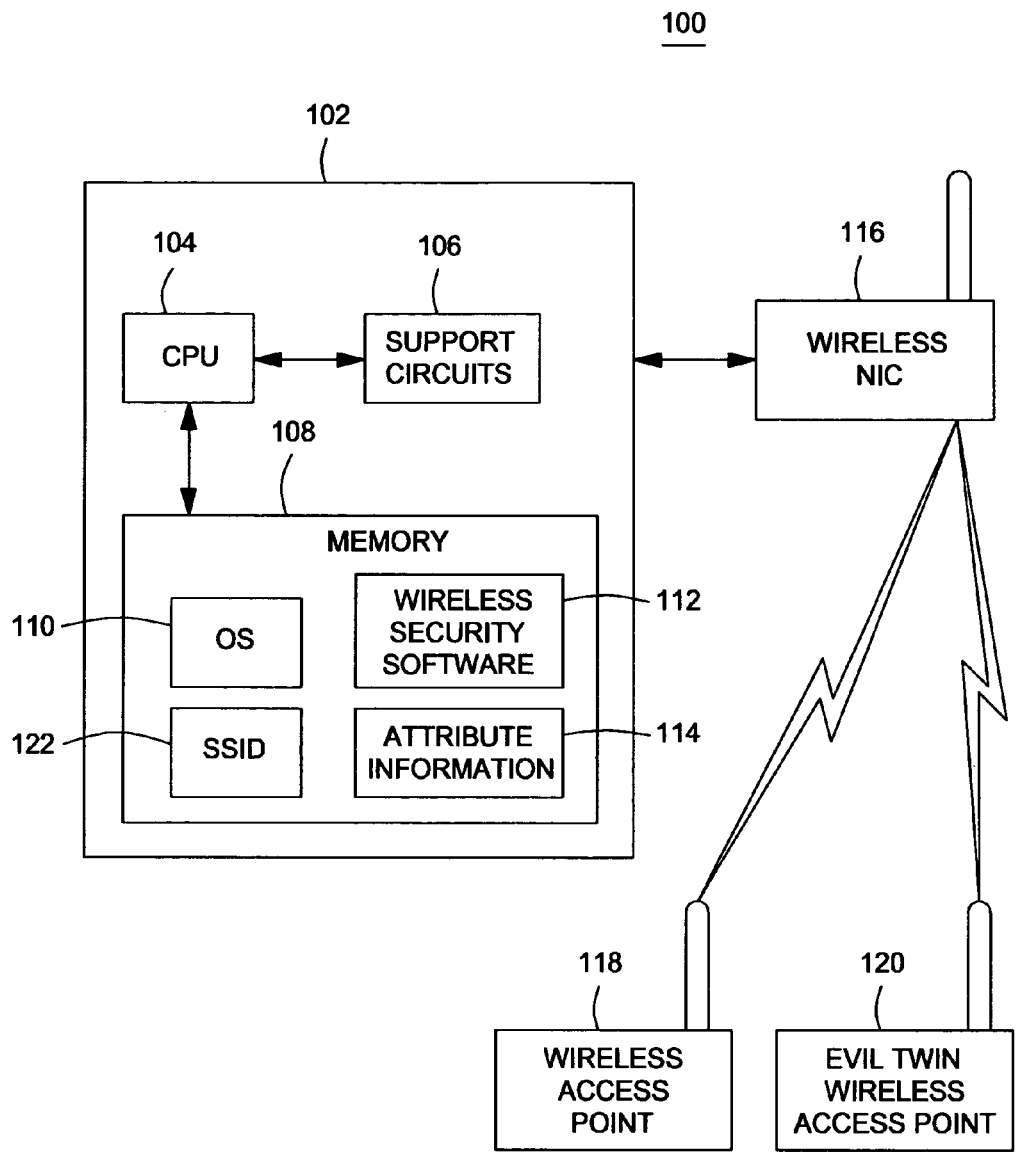
FIG. 1 is a diagram of a computing environment that can benefit from the present invention.

FIG. 1 is a computing environment 100 that can benefit from the present invention. The computing environment comprises a computing device 102 coupled to a wireless network interface card (NIC) 116, a wireless access point 118 and an "evil twin" wireless access point 120. Although the wireless NIC 116 is shown separate from the computing device 102, one skilled in the art will appreciate the wireless NIC 116 can be an internal component of the computing device 102.

The computing device 102 is any desktop computer, laptop computer, personal digital assistant (PDA) or any device that can benefit from a wireless connection to a network. The computing device 102 comprises a central processing unit (CPU) 104, support circuits 106 and a memory 108. The CPU 104 comprises one or more conventionally available microcontrollers. The support circuits 106 are well known circuits used to promote functionality of the CPU 108. Such circuits may include cache, power supplies, clock circuits, input/output interface circuits, and the like.

The memory 108 may comprise one or more of random access memory, read only memory, flash memory, removable disk storage, and the like. The memory 108 may store various software packages, such as an operating system (OS) software 110, wireless security software 112 and service set identifier (SSID) attributes 114.

The wireless NIC 116 provides wireless access to a communications network such as the Internet or a LAN. The wireless NIC 116 may be an internal component of the computing device 102, a PCMCIA card inserted into a slot the computing device 102, connected to the computing device via a Universal Serial Bus (USB) port or coupled to the computing device 102 by any other common means. The wireless NIC 116 may comply with any wireless network standard, such as 802.11a, b, g and n.

The wireless access point 118 is any device capable of broadcasting an SSID. Typically, the wireless access point 118 is a wireless router such as an 802.11g compliant wireless router. The wireless access point 118 may also be a desktop or laptop computer. The wireless access point 118 is usually connected to a wired communications network, allowing the computing device 102 to connect to the wired communications network.

The "evil twin" wireless access point 120 is also any device capable of broadcasting an SSID identical to the SSID broadcast by the wireless access point 118. The evil twin wireless access point 120 may be a wireless router, a desktop or laptop computer. The evil twin wireless access point 120 is set to broadcast the same SSID as the wireless access point 118. Once the computing device 102 connects to the evil twin wireless access point 120, a cybercriminal can record or misappropriate any information originally intended for the legitimate wireless access point 118.

The following scenario will detail how such a cybercriminal can utilize the evil twin wireless access point 120 to victimize an unsuspecting public. A coffee shop may provide free wireless Internet access to its customers Assume the computing environment 100 is situated within this particular coffee shop and the wireless access point 118 is broadcasting an SSID set to "JAVA".

As a customer enters the computing environment 100 his/her computing device 102 detects the SSID "JAVA" broadcast from the wireless access point 118. Assume the computing device 102 is running MICROSOFT WINDOWS as the operating system 110. If the SSID "JAVA" is stored in the MICROSOFT WINDOWS registry, the computing device 102 may automatically attempt to connect to the wireless access point 118. Once the computing device 102 is connected to the wireless access point 118, the customer can usually access information on a much broader network such as the Internet.

A sophisticated cybercriminal determined to intercept wireless transmissions designated for the wireless access point 118 can do so by deploying the "evil twin" wireless access point 120 within the computing environment 100. For example, if the coffee shop has an outdoor café seating area and the legitimate wireless access point 118 is situated indoors, the cybercriminal may deploy the evil twin wireless access point 120 in the area of the outdoor café. The cybercriminal would set the evil twin wireless access point 120 to broadcast the same SSID as the legitimate wireless access point 118. In this example, the evil twin wireless access point 120 would broadcast the SSID "JAVA".

The signal strength from the evil twin wireless access point 120 would be stronger than the signal strength from the legitimate wireless access point 118 in the outdoor café area. Unsuspecting customers seated in the outdoor café area would connect their computers, such as the computing device 102, to the evil twin wireless access point 120 on the belief it was the legitimate wireless access point 118 provided by the coffee shop.

Once the computing device 102 is connected to the evil twin wireless access point 120, the cybercriminal can record any information provided to the evil twin wireless access point 120. This information may include sensitive information such as a user name and a password, credit card information and the like. Because the customer is unaware he has connected to the evil twin wireless access point 120, the event and theft of information is often undetected.

Figure 2:
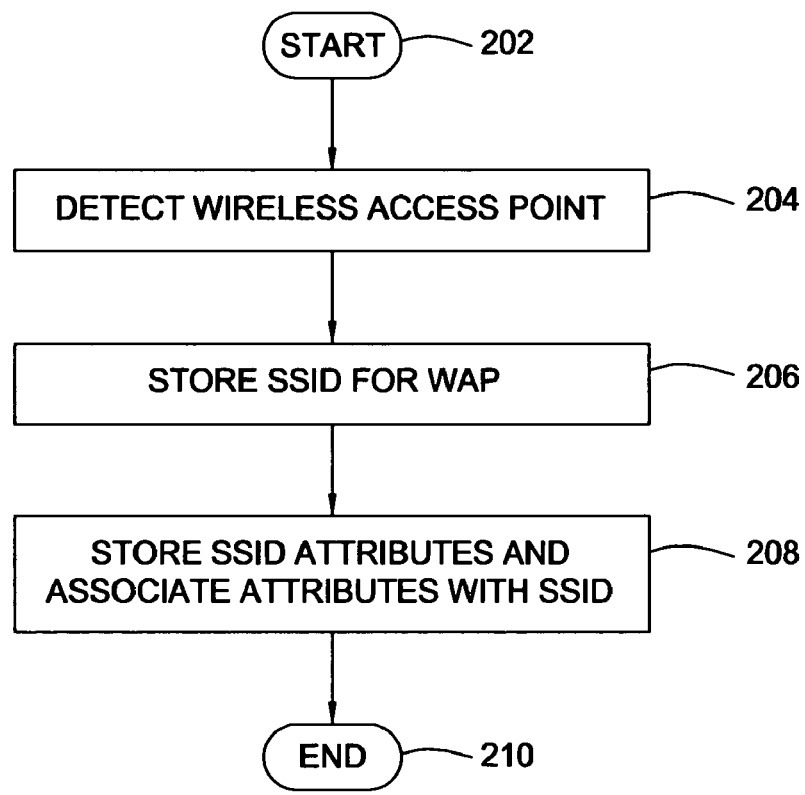
FIG. 2 is a flow diagram of a method for storing wireless access point attribute information.

FIG. 2 is a flow diagram of a method 200 for storing wireless access point attribute information for a wireless access point such as those shown in FIG. 1. Previously, a wireless access point could authenticate a computing device, but the computing device was unable to authenticate the wireless access point. The present invention enables the computing device to authenticate the wireless access point with a high degree of certainty. The method 200 assumes the computing device is connecting to a legitimate wireless access point. At a cold start, i.e., the first connection to any wireless access point, the computing device is unable to differentiate between a legitimate wireless access point and an evil twin wireless access point.

The method 200 starts at step 202 and proceeds to step 204. At step 204, a computing device 102 detects the presence of a wireless access point 118. The wireless access point 118 may be a wireless router or any wireless device capable of connecting the computing device 102 to a larger network as described above.

The wireless access point 118 broadcasts an SSID that identifies the wireless access point 118. Ideally, the SSID is a unique name that allows the computing device to identify the wireless access point 118. The wireless access point 118 broadcasts data in frames. There are three kinds of frames utilized by 802.11 compliant wireless access points: management frames, control frames and data frames.

There are also frame subtypes. Management frame subtypes comprise: authentication frames, deauthentication frames, association request frames, association response frames, reassociation request frames, reassociation response frames, beacon frames, probe request frames and probe response frames. All of the above listed management frame subtypes comprise a MAC address of the source device, i.e., the MAC address for the wireless access point 118, a MAC address for the destination device, e.g., a MAC address for the computing device 102, frame sequence number, frame body, and frame check sequence for error detection.

The beacon frame further comprises an SSID, a timestamp, a beacon interval, an indicia of supported rates, capability information, a traffic indication map, and a parameter set. The parameter set comprises frequency hopping information, spread spectrum information, hopping pattern, dwell time, direct sequence spread spectrum and Dynamic Hub Station Selection (DHSS) protocol information.

The wireless access point 118 broadcasts a beacon frame periodically, e.g., usually every 100 ms, to announce the presence of the wireless access point 118 to any computing device having a wireless network interface card, e.g., the computing device 102 and wireless NIC 116. The beacon frame identifies the wireless access point 118 by at least the SSID and the source MAC address.

At step 206, the computing device 102 stores the SSID associated with the wireless access point 118. In one embodiment of the invention, the computing device utilizes a MICROSOFT WINDOWS operating system 110 and the SSID is stored in the MICROSOFT WINDOWS registry. Other operating systems may store the SSID in a different manner. By storing the SSID, the operating system 110 can maintain a list of known networks previously connected to by the computing device 102.

At step 208, the computing device 102 also stores attribute information 114 associated with the SSID. The attribute information comprises the information within the beacon frame except for the SSID. More specifically, attribute information comprises a timestamp, a beacon interval, an indicia of supported rates, capability information, a traffic indication map, frequency hopping information, spread spectrum information, hopping pattern, dwell time, direct sequence spread spectrum and DHSS.

While many different wireless access points are capable of broadcasting the same SSID, e.g., as described in the above scenario, the attribute information 114 differs from manufacturer to manufacturer. For example, an 802.11g wireless access point manufactured by BELKIN and an 802.11g wireless access point manufactured by NETGEAR may both broadcast an identical SSID, e.g., "JAVA" as described above. However, the attribute information 114 will differ for the BELKIN wireless access point and the NETGEAR wireless access point.

At the very least, each wireless access point has a unique Media Access Control (MAC) address. The MAC address identifies the manufacturer and provides other information about each wireless access point. MAC addresses are well known to a person of ordinary skill in the art.

A MAC address may be spoofed, i.e., a hardware device may provide a MAC address other than its own MAC address to another hardware device. However, it is difficult to spoof attribute information 114 such as beacon interval, dwell time and frequency hopping or a combination of attributes. Thus, attribute information 114 can be used to further authenticate a MAC address supplied by a hardware device.

By storing the MAC address and attribute information 114 for the wireless access point 118 and associating the MAC address and attribute information 114 with the SSID for the wireless access point 118, a complete profile for the wireless access point 118 can be created and maintained.

Wireless security software 112 can utilize the complete profile to authenticate the wireless access point 118 each time the computing device 102 attempts to connect to the wireless access point 118. The method 200 ends at step 210.

Figure 3:
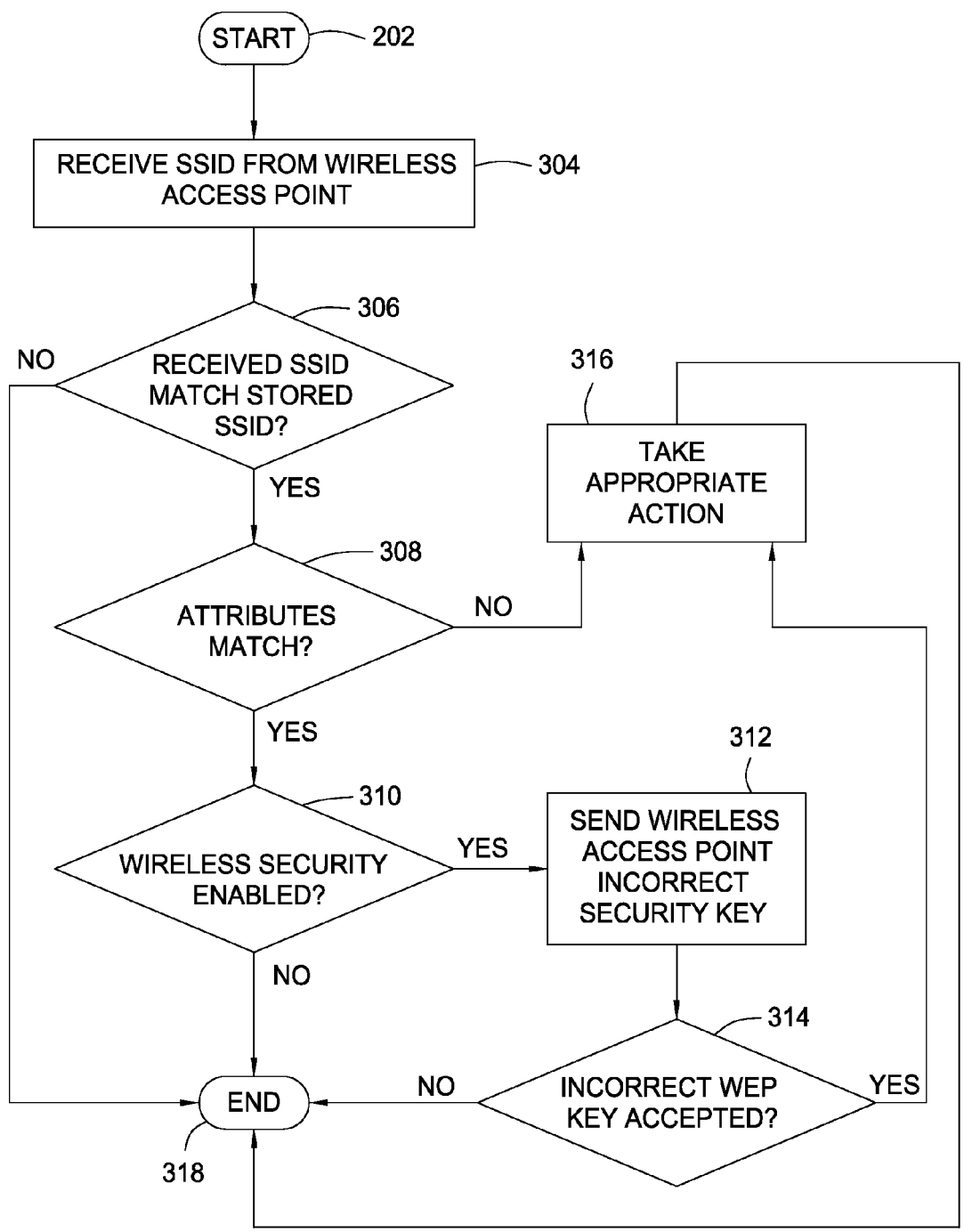
FIG. 3 is a flow diagram of a method for authenticating a wireless access point.

FIG. 3 is a flow diagram of a method 300 for authenticating a wireless access point 118. The method 300 begins at step 302 and proceeds to step 304. At step 304, a computing device 102 receives an SSID from the wireless access point 118.

At decision step 306, wireless security software 112 executed by the computing device 102 determines if the received SSID matches an SSID stored in the MICROSOFT WINDOWS registry. If the received SSID does not match any SSID stored in the MICROSOFT WINDOWS registry, i.e., the computing device 102 never encountered that particular SSID in the past, then the method 300 proceeds to step 318 and terminates.

If the received SSID matches an SSID stored in the MICROSOFT WINDOWS registry, then the method 300 proceeds to decision step 308. At decision step 308, the wireless security software 112 attempts to authenticate the wireless access point 118 that broadcast the SSID. The SSID is broadcast within a beacon frame. The beacon frame comprises attribute information 114 and the SSID as described above. Each time the computing device 102 encounters an unknown SSID, the wireless security software 112 stores the SSID in the MICROSOFT WINDOWS registry and stores attribute information obtained from the beacon frame associated with the SSID. The wireless security software 112 matches the attribute information received from the wireless access point 118 against the stored attribute information stored 114.

While two wireless access points, e.g., wireless access point 118 and wireless access point 120, may broadcast the same SSID, the attribute information may differ. At the very least, the MAC address broadcast by the wireless access point 118 should differ from any other wireless access point because the MAC address is unique for every wireless access point. Since no two wireless access points are assigned the same MAC address, the MAC address can be used to authenticate a wireless access point broadcasting a previously stored SSID.

The wireless access point 118 can be further authenticated by matching the attribute information broadcast by the wireless access point 118 within a beacon frame to the stored attribute information 114. Attribute information cannot easily be spoofed by an evil twin wireless access point, e.g., wireless access point 120. If the attribute information broadcast by the wireless access point 118 matches the stored attribute information, then there is a high probability the wireless access point 118 is a legitimate wireless access point. The method 300 proceeds to decision step 310 if the attribute information matches the stored attribute information 114.

If the attribute information does not match the stored attribute information 114, then the method 300 proceeds to step 316. At step 316, the wireless security software 112 takes an appropriate action. The appropriate action may include alerting the user of a possible evil twin wireless access point, e.g., wireless access point 120, disconnecting the computing device 102 from the evil twin wireless access point 120, or any other action that safeguards the computing device 102 from malicious behavior.

At decision step 310, the wireless security software determines if the wireless access point 118 has wireless security enabled, e.g., Wired Equivalent Privacy (WEP) enabled. If wireless security is not enabled, then the method 300 proceeds to step 318. The method 300 terminates at step 318.

If wireless security is enabled, then the method 300 proceeds to step 312. At step 312, the wireless security software 112 sends the wireless access point 118 a security key, e.g., a WEP key. A cybercriminal may set an evil twin wireless access point, e.g., wireless access point 120, to broadcast that wireless security, e.g., WEP, is enabled to provide an illegitimate sense of security that a user is connecting to a secure access point. A legitimate wireless access point will only accept a correct security key before allowing communication with the computing device 102. An evil twin wireless access point will accept any security key transmitted from the computing device 102.

The wireless security software 112 can test the legitimacy of the wireless security connection by providing an incorrect security key to the wireless access point 118. Conventionally, only one security key will grant access to the wireless access point 118. If the wireless access point 118 accepts more than one security key as the connect key, there is a danger that the security of the wireless access point 118 is compromised.

At decision step 314, if an incorrect security key is accepted, then the method 300 proceeds to step 312 where an appropriate action is taken as described above. If the wireless access point 318 does not permit communication after receiving an incorrect security key, then the wireless security is legitimately enabled. If the SSID and the attribute information broadcast by the wireless access point matches the SSID stored in the MICROSOFT WINDOWS registry and the stored attribute information 114 and an incorrect security key is not accepted by the wireless access point 118, then the wireless access point 118 is authenticated by the method 300. The method 300 ends at step 318.

The present invention provides the benefit of enabling a computing device to authenticate a wireless access point. Previously, only a wireless access point could authenticate a computing device. Wireless access points broadcast SSIDs to announce their presence to nearby computing devices. A conventional computing device identifies wireless access points only by the SSID. By storing additional information such as MAC address and attribute information and associating the additional information with a particular SSID, the computing device can utilize wireless security software to authenticate wireless access points. Thus, the present invention helps prevent the computing device from connecting to evil twin wireless access points.

While the foregoing is directed to embodiments of the present invention, other and further embodiments of the invention may be devised without departing from the basic scope thereof, and the scope thereof is determined by the claims that follow.

The invention claimed is:

1. A method for authenticating a wireless access point performed by a wireless device comprising:
    upon the wireless device initially connecting to the wireless access point, storing a first service set identifier associated with the wireless access point;
    determining a first at least one wireless access point attribute for the wireless access point wherein the first at least one wireless access point attribute comprises a set of information contained within a first beacon frame associated with the wireless access point except the service set identifier;
    storing the at least one wireless access point attribute for the wireless access point;
    associating the first at least one wireless access point attribute for the wireless access point with the first service set identifier for the wireless access point;
    upon reconnection to the wireless access point, obtaining a second service set identifier from the wireless access point;
    matching the second service set identifier to the first service set identifier;
    determining a second at least one wireless access point attribute for the wireless access point wherein the second at least one wireless access point attribute comprises a set of information contained within a second beacon frame associated with the wireless access point except the service set identifier; and
    comparing the first at least one wireless access point attribute and the second at least one wireless access point attribute to verify that the wireless access point is not a rogue access point wherein the set of information contained within the first beacon frame comprises a beacon interval, a timestamp, a list of supported rates, one or more parameter sets, a set of capability information, a traffic indication map, a set of frequency hopping information, a set of spread spectrum information, a hopping pattern, a dwell time, a direct sequence spread spectrum and a set of dynamic hub station selection protocol information.

2. The method of claim 1 wherein the first at least one wireless access point attribute further comprises a media access control address and the second at least one wireless access point attribute further comprises a media access control address.

3. The method of claim 2 further comprising matching the second media access control address to the first media access control address and if the second media access control address does not match the first media access control address taking an appropriate action wherein the appropriate action comprises alerting a user to a possible evil twin wireless access point and blocking communication with the wireless access point.

4. The method of claim 2 wherein the second media access control address matches the first media access control address further comprising obtaining a second set of attribute information from the wireless access point.

5. The method of claim 4 further comprising matching the second set of attribute information to the first set of attribute information and if the second set of attribute information does not match the first set of attribute information taking the appropriate action.

6. The method of claim 4 further comprising matching the second set of attribute information to the first set of attribute information and if the second set of attribute information matches the first set of attribute information determining if wireless security is enabled for the wireless access point.

7. The method of claim 6 wherein wireless security is enabled further comprising:
   providing at least two security keys to the wireless access point and identifying the wireless access point as a rogue access point when both keys are accepted.

8. The method of claim 6 wherein wireless security is enabled further comprising:
   providing an incorrect security key other than a known correct security key to the wireless access point and if the wireless access point accepts the incorrect security key identifying the wireless access point as a rogue access point.

9. A non-transitory computer-readable medium having stored thereon a plurality of instructions, the plurality of instructions including instructions which, when executed by a processor, cause the processor to perform the steps of:
   upon a wireless device initially connecting to the wireless access point, storing a first service set identifier associated with the wireless access point;
   determining a first at least one wireless access point attribute for the wireless access point wherein the first at least one wireless access point attribute comprises a set of information contained within a first beacon frame associated with the wireless access point except the service set identifier;
   storing the at least one wireless access point attribute for the wireless access point;
   associating the first at least one wireless access point attribute for the wireless access point with the first service set identifier for the wireless access point;
   upon reconnection to the wireless access point, obtaining a second service set identifier from the wireless access point;
   matching the second service set identifier to the first service set identifier;
   determining a second at least one wireless access point attribute for the wireless access point wherein the second at least one wireless access point attribute comprises a set of information contained within a second beacon frame associated with the wireless access point except the service set identifier; and
   comparing the first at least one wireless access point attribute and the second at least one wireless access point attribute to verify that the wireless access point is not a rogue access point wherein the set of information contained within the first beacon frame comprises a beacon interval, a timestamp, a list of supported rates, one or more parameter sets, a set of capability information, a traffic indication map, a set of frequency hopping information, a set of spread spectrum information, a hopping pattern, a dwell time, a direct sequence spread spectrum and a set of dynamic hub station selection protocol information.

10. The non-transitory computer-readable medium of claim 9 further causing the processor to perform the steps of storing a media access control address for the wireless access point and associating the media access control address for the wireless access point with the service set identifier for the wireless access point.

11. The non-transitory computer-readable medium of claim 10 further causing the processor to perform the steps of matching the second media access control address to the first media access control address and if the second media access control address does not match the first media access control address taking an appropriate action wherein the appropriate action comprises alerting a user to a possible evil twin wireless access point and blocking communication with the wireless access point.

12. The non-transitory computer-readable medium of claim 11 further causing the processor to obtain a second set of attribute information and matching the second set of attribute information to the first set of attribute information and if the second set of attribute information does not match the first set of attribute information taking the appropriate action.

13. The non-transitory computer-readable medium of claim 12 further causing the processor to provide at least two security keys to the wireless access point and identifying the wireless access point as a rogue access point when both keys are accepted.

14. The non-transitory computer-readable medium of claim 12 further causing the processor to provide an incorrect security key other than a known correct security key to the wireless access point and identifying the wireless access point as a rogue access point when the incorrect security key is accepted.

15. A system for authenticating a wireless access point comprising:
   a wireless access point for providing a service set identifier and a first set of network attributes wherein the first set of attributes comprises a set of information contained within a first beacon frame associated with the wireless access point except the service set identifier; and
   a computing device having a processor and a memory wirelessly coupled to the wireless access point for determining the first set of network attributes and storing the service set identifier and the first set of network attributes to use the service set identifier and the first set of network attributes for subsequent authentication of the wireless access point wherein the computing device associates the first set of network attributes for the wireless access point with the service set identifier for the wireless access point, and wherein the computing device, upon reconnection to the wireless access point, obtains a second service set identifier from the wireless access point; matches the second service set identifier to the first service set identifier and if the second service set identifier matches the first service set identifier, obtains a second set of network attributes wherein the second set of attributes comprises a set of information contained within a second beacon frame associated with the wireless access point except the service set identifier from the wireless access point; and matches the second set of network attributes to the first set of network attributes and if the second set of network attributes does not match the first set of network attributes taking an appropriate action wherein the appropriate action comprises alerting a user to a possible evil twin wireless access point and blocking communication with the wireless access point wherein the set of information contained within the first beacon frame comprises a beacon interval, a timestamp, a list of supported rates, one or more parameter sets, a set of capability information, a traffic indication map, a set of frequency hopping information, a set of spread spectrum information, a hopping pattern, a dwell time, a direct sequence spread spectrum and a set of dynamic hub station selection protocol information.

* * * * *